United States Patent
McQueen et al.

(10) Patent No.: US 8,430,318 B2
(45) Date of Patent: Apr. 30, 2013

(54) SYSTEM AND METHOD FOR DATA READING WITH LOW PROFILE ARRANGEMENT

(75) Inventors: Alexander M. McQueen, Eugene, OR (US); Bryan L. Olmstead, Eugene, OR (US); Alan Shearin, Eugene, OR (US)

(73) Assignee: Datalogic ADC, Inc., Eugene, OR (US)

( * ) Notice: Subject to any disclaimer, the term of this patent is extended or adjusted under 35 U.S.C. 154(b) by 66 days.

(21) Appl. No.: 12/985,271

(22) Filed: Jan. 5, 2011

(65) Prior Publication Data

US 2011/0168780 A1 Jul. 14, 2011

Related U.S. Application Data

(60) Provisional application No. 61/293,560, filed on Jan. 8, 2010.

(51) Int. Cl.
*G06K 7/10* (2006.01)

(52) U.S. Cl.
USPC .......................................... 235/470; 235/375

(58) Field of Classification Search ................. 235/470, 235/375, 462.11, 462.41, 462.24
See application file for complete search history.

(56) References Cited

U.S. PATENT DOCUMENTS

| 4,652,732 A | 3/1987 | Nickl |
| 4,799,164 A | 1/1989 | Hellekson et al. |
| 4,861,973 A | 8/1989 | Hellekson et al. |
| 5,268,565 A | 12/1993 | Katoh et al. |
| 5,410,108 A | 4/1995 | Williams et al. |
| 5,936,218 A | 8/1999 | Ohkawa et al. |
| 6,045,046 A | 4/2000 | Detwiler |
| 6,188,500 B1 | 2/2001 | Rudeen et al. |
| 6,330,973 B1 | 12/2001 | Bridgelall et al. |
| 6,830,186 B1 | 12/2004 | Nahar |

(Continued)

FOREIGN PATENT DOCUMENTS

| EP | 0424096 A1 | 4/1991 |
| JP | 2000-028424 A | 2/2000 |

OTHER PUBLICATIONS

U.S. Appl. No. 29/382,063, filed Dec. 28, 2010, entitled Weigh Platter or Cover for Data Recorder, which is a divisional of D631,479.

(Continued)

*Primary Examiner* — Edwyn Labaze
(74) *Attorney, Agent, or Firm* — Stoel Rives LLP

(57) ABSTRACT

A data reader, such as an optical code reader, including one or more imagers, the data reader having a generally horizontal central section with an upward extension on a first end and a depression on a second end opposite the upward extension, the depression being configured to provide a better angle of view of an object in the view volume above the central section from the second end from a position below the surface of the horizontal central section. In one configuration, an image from the view volume along and over the depression is directed by one or more fold mirrors and focused by a lens system onto an imager or sensor array, these optics components, along with the window through which they view, are all disposed below the surface of the central section. Preferably, where the horizontal central section is a weigh platter for a scanner-scale, the optics of the data reader such as the fold mirror(s), lens system and imager are unsupported by the weigh platter and thus are off the scale.

16 Claims, 11 Drawing Sheets

U.S. PATENT DOCUMENTS

| | | | |
|---|---|---|---|
| 7,191,947 B2 | 3/2007 | Kahn et al. | |
| RE40,071 E | 2/2008 | Svetal et al. | |
| 7,389,932 B1 | 6/2008 | Roquemore et al. | |
| 7,780,086 B2 | 8/2010 | Barkan et al. | |
| 7,780,087 B2 | 8/2010 | Bobba et al. | |
| D631,478 S | 1/2011 | McQueen et al. | |
| 8,033,472 B2 | 10/2011 | Giebel et al. | |
| 2006/0278708 A1 | 12/2006 | Olmstead | |
| 2008/0023560 A1* | 1/2008 | He et al. | 235/462.42 |
| 2008/0180907 A1* | 7/2008 | Lee | 361/690 |
| 2009/0020612 A1 | 1/2009 | Drzymala et al. | |
| 2010/0200656 A1* | 8/2010 | Marshall et al. | 235/383 |
| 2010/0282850 A1 | 11/2010 | Olmstead et al. | |

OTHER PUBLICATIONS

International Search Report and Written Opinion, PCT/US2011/020373, Feb. 22, 2013 (PCT application corresponding to the present application).

* cited by examiner

SYSTEM AND METHOD FOR DATA READING WITH LOW PROFILE ARRANGEMENT

RELATED APPLICATION DATA

This application claims priority to U.S. provisional application No. 61/293,560 filed Jan. 8, 2010, hereby incorporated by reference.

BACKGROUND

The field of the present disclosure relates generally to systems and methods for data reading and/or image capture, and more particularly but not exclusively to reading of optical codes such as, for example, barcodes.

Data reading devices are used to read optical codes, acquire data, and capture a variety of images. One common data reader device is an optical code reader. Optical codes typically comprise a pattern of dark elements and light spaces. There are various types of optical codes, including linear or 1-D (one-dimensional) codes such as UPC and EAN/JAN barcodes, 2-D (two-dimensional codes) such as MaxiCode codes, or stacked codes such as PDF 417 codes. For convenience, some embodiments may be described herein with reference to capture of 1-D barcodes, but the embodiments may also be useful for other optical codes and symbols as well as other images such as fingerprint capture.

One type of data reader is referred to as flying spot scanner wherein an illumination beam is moved (i.e., scanned) across the barcode while a photodetector monitors the reflected or backscattered light. For example, the photodetector may generate a high voltage when a large amount of light scattered from the barcode impinges on the detector, as from a light space, and likewise may produce a low voltage when a small amount of light scattered from the barcode impinges on the photodetector, as from a dark bar. The illumination source in spot scanners is a typically a coherent light source, such as a laser or laser diode, but may comprise a non-coherent light source such as light emitting diode. A laser illumination source may offer advantages of higher intensity illumination which may allow barcodes to be read over a larger range of distances from the barcode scanner (large depth of field) and under a wider range of background illumination conditions.

Another type of data reader is an imaging reader that employs an imaging device or sensor array, such as a CCD (charge coupled device) or CMOS (complementary metal oxide semiconductor) device. Imaging readers can be configured to read both 1-D and 2-D optical codes, as well as other types of optical codes or symbols and images of other items. When an imaging reader is used to read an optical code, an image of the optical code or portion thereof is focused onto a detector array. Though some imaging readers are capable of using ambient light illumination, an imaging reader typically utilizes a light source to illuminate the item being read, to provide the required signal response in the imaging device. A camera is typically a combination of a lens and an imaging device/sensor array, but the terms imager and camera will be used somewhat interchangeably herein.

An imager-based reader utilizes a camera or imager to generate electronic image data, typically in digital form, of an optical code. The image data is then processed to find and decode the optical code. For example, virtual scan line techniques are known techniques for digitally processing an image containing an optical code by looking across an image along a plurality of lines, typically spaced apart and at various angles, somewhat similar to the scan pattern of a laser beam in a laser-based scanner.

High performance optical code reading devices have evolved into a form typically requiring a large, tall (vertical) housing section to allow effective reading of the vertical faces of passing items. More recent development of more compact imaging-based readers has allowed the miniaturization of the protruding vertical housings, but still relies on some amount of enclosure height above the horizontal scanning surface in order to adequately cover codes near this plane. On the side opposite the operator (i.e., the customer side), the vertical housing section is distal from the operator and does not interfere with motion of items through the read region. Vertical housing extensions on the side of the reader proximate the operator have been proposed to provide a raised section providing a better/higher reading angle for reading sides of objects facing the operator.

For a standing operator, vertical features on the side of a scanning device proximate the operator (i.e., the checker side) typically do not interfere with the movement of items across the scanner because the operator's limbs are well above the scanning surface. The present inventor has recognized that for a seated operator, however, a significant protrusion above the horizontal surface in the area where they move their hands and arms can interfere with ergonomic movement of items across the data reader. Repetitive collisions of items or the operator's hands and arms with raised housing sections during the course of a duty shift can take a significant toll on the operator and may induce injuries. The present inventor has, therefore, determined that it would be desirable to provide a data reader that improves on the limitations of existing readers.

BRIEF DESCRIPTION OF THE DRAWINGS

Understanding that drawings depict only certain preferred embodiments and are not therefore to be considered to be limiting in nature, the preferred embodiments will be described and explained with additional specificity and detail through the use of the accompanying drawings.

DETAILED DESCRIPTION OF EMBODIMENTS

With reference to the above-listed drawings, this section describes particular embodiments and their detailed construction and operation. The embodiments described herein are set forth by way of illustration only and not limitation. It should be recognized in light of the teachings herein that other embodiments are possible, variations can be made to the embodiments described herein, and there may be equivalents to the components, parts, or steps that make up the described embodiments.

For the sake of clarity and conciseness, certain aspects of components or steps of certain embodiments are presented without undue detail where such detail would be apparent to those skilled in the art in light of the teachings herein and/or where such detail would obfuscate an understanding of more pertinent aspects of the embodiments.

Various imager-based optical code readers and associated methods are described herein. Some embodiments of these optical code readers and systems improve the performance of optical code readers by providing multiple image fields to capture multiple views.

In some embodiments, an image field of an imager may be partitioned into two or more regions, each of which may be used to capture a separate view of the view volume. In addition to providing more views than imagers, such embodiments may enhance the effective view volume beyond the view volume available to a single imager having a single point of view.

A successful high-volume barcode reader currently available is a laser-based scanner having a multiple window or bioptic configuration such as the Magellan® scanner available from Datalogic Scanning, Inc. of Eugene, Oreg. Retail establishments such as grocery stores require such high-volume and fast scanners. Thus checkout lanes, both checker-assisted and self-checkout, are currently configured to accommodate a bioptic scanner.

Data readers such as barcode scanners often include a scale apparatus for measuring weights of produce and other items sold by weight. The scale apparatus typically has a load cell and a weigh platter which rests on the load cell. The weigh platter is typically flush mounted with the top surface of a checkout counter.

Figure 1:
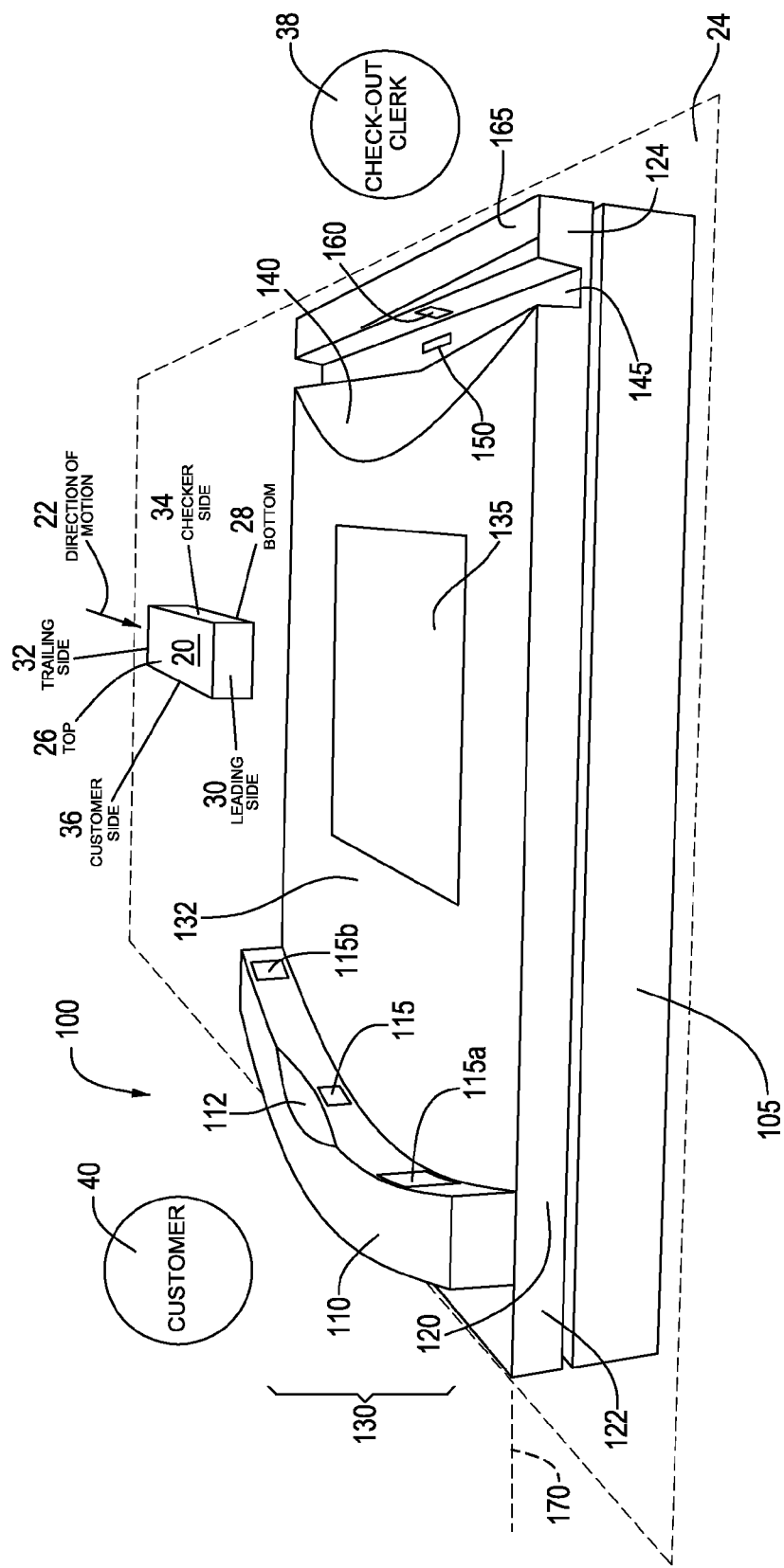
FIG. 1 is a perspective view of a data reader according to a first embodiment, and further illustrates an exemplary six-sided box-shaped object that may be passed through a view volume of the data reader.

FIG. 1 illustrates a data reader 100 and an exemplary object 20 that may be passed through a view volume of the data reader 100. The view volume may be a function of the enclosure and style of the data reader and the perspectives of the views in which images of the objects are captured. A perspective may encompass a location, direction, angle, or any combination of the foregoing, or the like, that characterize a vantage or point of view for seeing, imaging, visualizing via machine vision, or illuminating the object 20 or a part of the object 20.

For general purposes of discussion, the object 20 is represented by a rectangular shaped six-sided polyhedron, such as a cereal box (hereinafter referred to as a box-shaped item or object) that may be passed through a read region of a data reader, such as for example the data reader 100 installed in a checkout stand 24 at a retail store (e.g., a supermarket). As to the description of the following embodiments, it should be understood that certain capabilities of the data reader will be described with respect to reading sides of the box-shaped object 20 and that a checkout stand is an exemplary use for the optical code readers discussed herein and should not be considered as limiting.

For convenience of description, referring to FIG. 1, this box-shaped object 20 may be described with respect to its direction of travel 22 across a surface of the platter 130. For the purposes of description relative to the ability of an optical code reader 100 to read certain of the sides of the box-shaped object 20 being passed through the read volume defined by the windows 135, 115, and 160 in the orientation as illustrated, the box-shaped object may be described as having a top side 26, a bottom side 28, and four lateral sides 30, 32, 34, and 36. The lateral sides may be referred to as the leading (or left lateral) side 30 (the side leading the object as it is passed through the read region), the trailing (or right lateral) side 32 (the trailing side of the object as it is passed through the read region), the checker (or front lateral) side 34 (due to its proximity to a checkout clerk 38), and the customer (or rear lateral) side 36 (due to its proximity to a customer 40). A housing section or the vertical housing portion of an optical code reader 100 may separate the customer 40 from the object 20 if the optical code reader is a vertical optical code reader or a bi-optic optical code reader. The customer side 36 or rear lateral side may alternatively be described as a wall side 36 or a side oriented generally vertically facing the vertical window 115. The checker side 34 or front lateral side may alternatively be described as the side facing opposite the customer side 36. The front and rear lateral sides may be described as being disposed to one side of the central window 135 in a direction perpendicular to the item direction 22.

FIG. 1 illustrates a data reader 100 according to a first embodiment having a lower housing section 105 and an upper cover or weigh platter section 130. The platter section 130 includes a generally horizontal central section 120 with an upward extension 110 on a first end and a depression 140 on a second end opposite the upward extension. The data reader is typically 'buried' beneath a counter top or work surface of the checkout stand 24 up to the level of the horizontal surface 132 of the platter 130 indicated by dashed line 170. The operator stands or sits adjacent to the scanning device end 124 (the far or distal end from the vertical section 110), and away from end 122 (the near or proximate end to the vertical section 110), and moves items across the scanner horizontal surface 132. Read modules view items being moved past the view volumes of the scan windows 115, 135, and 160. Because the end 122 of the data reader 100 is on the side away from the operator, it is possible to provide a (preferably) small, vertically-protruding section 110 to contain a read module behind window 115. Additional read modules may be provided at different positions along the vertical section 110.

The read module behind window 115 is operative for viewing codes on item surfaces facing away from the operator, without interfering with the operator's limbs while items are moved through the read volume. For viewing codes on the operator's side, however, in order not to interfere, the top surface 165 of the end section 124 is at the same level 170 as the horizontal surface 132 of the platter 130. To adequately scan codes on the surfaces of items facing the operator, a gentle depression 140 is disposed in the otherwise horizontal surface 132 of the platter 130, extending from a position proximate the window 135 along a downward slope toward the checker end 124. The depression 140 allows the scanning module(s) housed behind window 160 to view down to very near the bottom of the items being scanned. A drain channel 145 and/or drain hole(s) 150 may be provided to divert spills and debris from accumulating in the channel 145 near the scan window 160. The depression 140 is generally central within the platter 130, terminating in the channel 145. The width of the channel 145 is such as to accommodate the width of an operator's finger or thumb, wherein an operator may, using a rag or paper towel, clean out debris or liquid accumulating in the channel 145. The bottom of the channel 145 may be flat or sloped. If there is a drain 150 at the center, the bottom of the channel may be sloped from the lateral sides inwardly toward the drain 150. The channel 145 may alternatively be arranged to have its highest point at its center, directly below window 160, with a downwards slope of the channel on either side of the window to divert liquids and other debris away from the window.

The shape of the depression 140 in combination with the channel 145 serves to provide a funneling or collection function for articles placed on the weigh platter 130. This function may be particularly useful for stabilizing spherical items being weighed, such as oranges or melons, which tend to roll, potentially rolling off scale. A melon, for example, will stabilize within the depression 140, against the back wall of the channel 145 facilitating the weighing operation.

The depression 140 in the figure is shown becoming deeper toward the center and nearer the channel 145 and becoming narrower nearer the window 135, but the depression may be of alternate shape, for example extending the entire width of the platter 130 (i.e., the entire length of the channel 145).

The vertical section 110 may also be formed with a central indention 112. The indention 112 serves a similar function of centering or stabilizing items being weighed that extend over and onto the top surface of the vertical section 110. The indention 112 combines with the arcuate shape of the vertical section 110, as well as with the depression 140 to stabilize items placed on the weigh scale. A particularly long article, such as a stalk of celery, may be stabilized with one end in the depression 140 and one end in the indentation 112.

Figure 2:
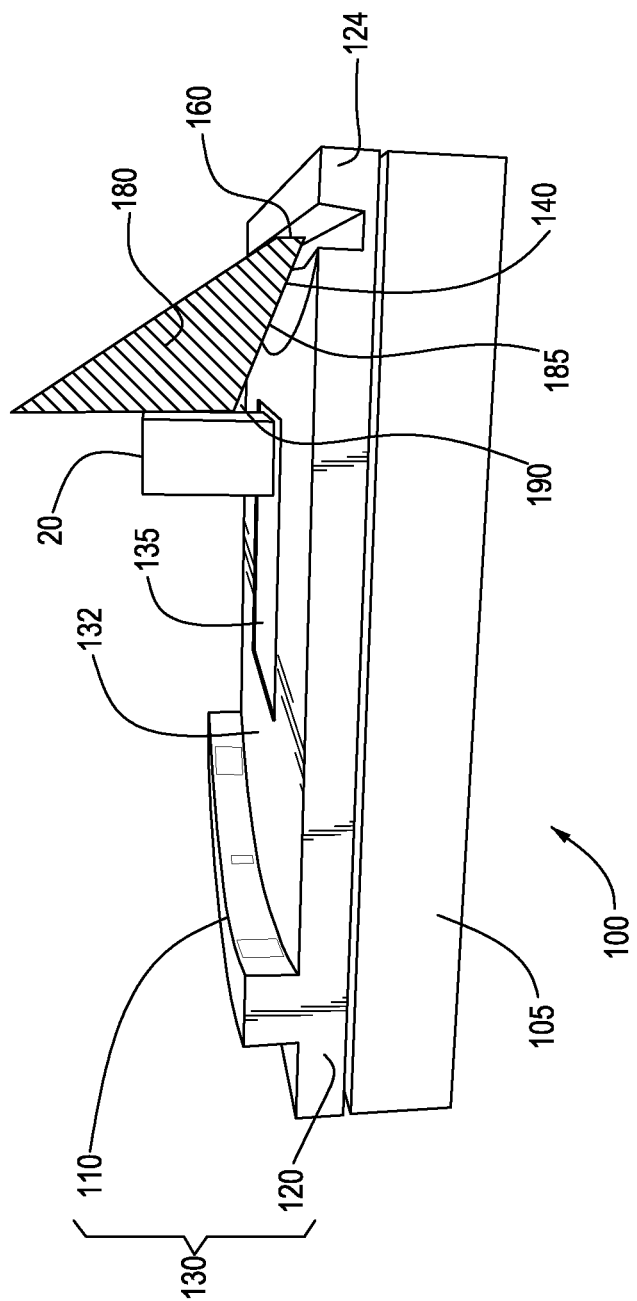
FIG. 2 is a diagrammatic side perspective view of the data reader of FIG. 1 illustrating a scan view from one of the imaging windows.

FIG. 2 illustrates a vertical extent of the view or perspective 180 of the read module or imager of the data reader 100 from the operator's side 124. The read module's view 180 exits the housing through scan window 160. The bottom edge 185 of the read module's view 180 is allowed to view very near to the bottom of scanned item 20 because of the presence of the concave depression 140 formed in the main horizontal surface or platter 130. This arrangement allows the minimization of the gap 190 in scan coverage at the base of the item 20.

Figure 3:
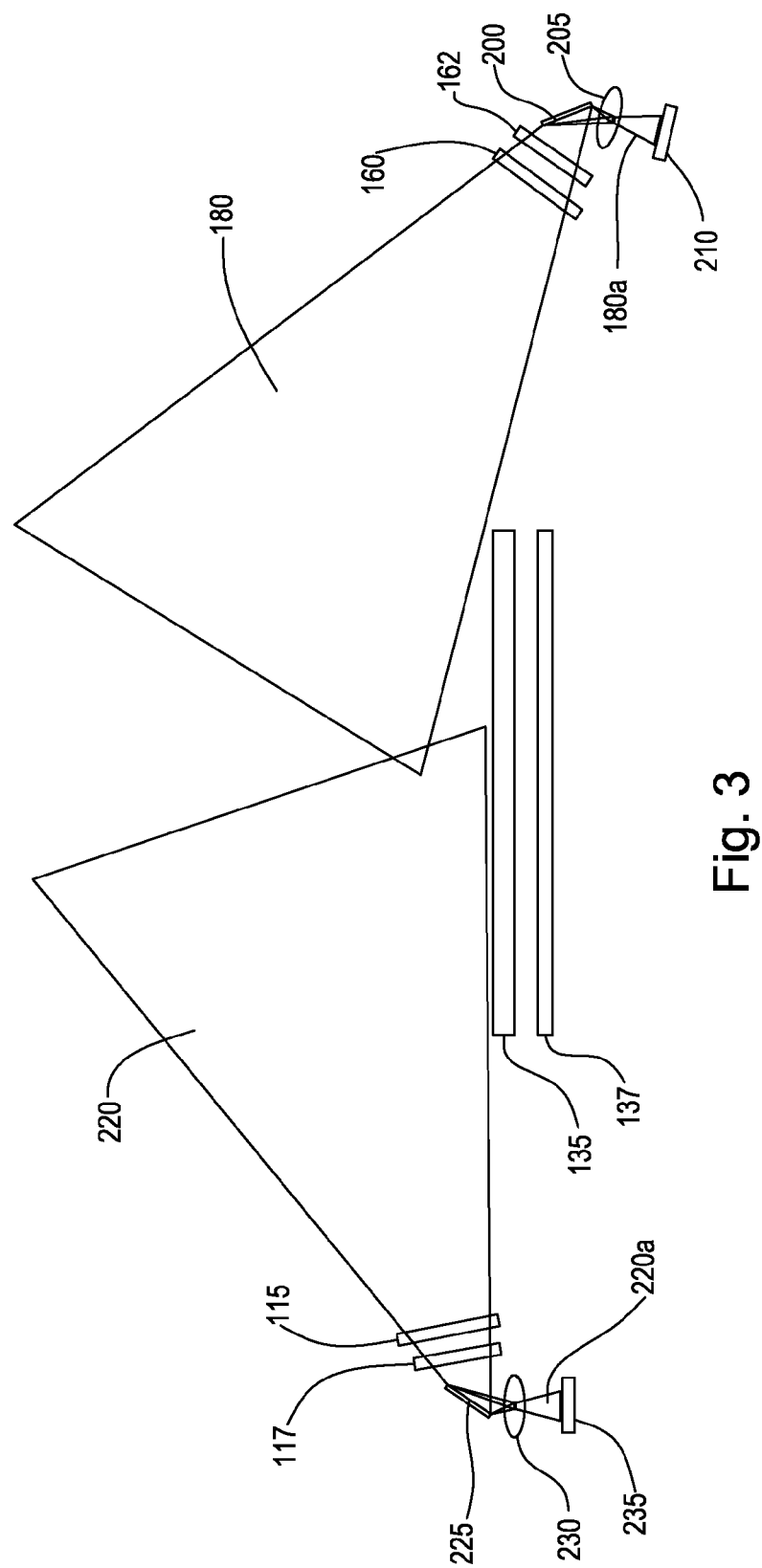
FIG. 3 is a schematic of scan regions and imaging components for the data reader of FIGS. 1-2.

FIG. 3 illustrates an example embodiment for imaging system components of the data reader 100 of FIG. 1 that may be operative for reading optical codes on a side of the item facing towards the data reader operator (checker side 34), or facing away from the operator (customer side 36). Most of the enclosure components have been removed to reveal the interior optical arrangement. For reference, the upper horizontal window 135 disposed in the platter 130 from FIGS. 1-2 is included in FIG. 3, with a lower horizontal window 137, not shown in FIGS. 1-2, disposed below the upper horizontal window 135. Typically, where the data reader includes a scale (and thus the data reader is a scanner-scale), the entire horizontal housing portion 130 comprises a weigh platter supported on a load cell in accordance with a suitable construction. The lower window 137 serves to seal off the internal components within the lower housing section 105. The internal/lower window 137 may also permit the platter 130 to be removable without exposing internal components.

The checker side 34 of items facing the operator are primarily viewed by the folded imaging system comprising an imager or sensor array 210, lens system 205, primary fold mirror 200, and windows 160, 162. The field of view of this camera in the plane of the figure is represented by the shaded regions 180 and 180a. Region or view segment 180a is the field of view of the camera formed by image sensor 210 and lens system 205 before reflection from primary fold mirror 200. Region or view segment 180 is the same field of view of the camera (image sensor 210 and lens system 205) after being redirected or folded by primary fold mirror 200. The arrangement of the aforementioned components is such that none of these components protrudes substantially above the plane 170 defined by the top surface of the upper horizontal window 135, yet still allows the field of view 180 to exit/enter at a position and angle necessary for reading optical codes on the checker side 34 of objects facing the operator without the need for overly large and expensive windows. This feature may be operative for providing an obstruction-free work surface which does not interfere with the operator's body movements.

In a similar fashion, the customer side 36 of an item 20 with codes facing away from the operator is primarily viewed by the folded imaging system comprising imager or sensor array 235, lens system 230, folding mirror 225, and windows 115, 117. The field of view of this camera in the plane of the FIG. 3 is represented by the shaded regions 220 and 220a. Region or view segment 220a is the field of view of the camera formed by image sensor 235 and lens system 230 prior to reflection from fold mirror 225. Region or view segment 220 is the camera (image sensor 235 and lens system 230) field of view after being redirected or folded by primary fold mirror 225. This imaging system's components may protrude above the top surface of horizontal window 135 because they are distant from the operator and should not interfere with typical body motions of the operator. It is possible in alternative embodiments that both cameras may protrude above the work surface, or that neither may protrude above the work surface.

The preferred embodiment provides a slightly concave feature 140 (also referred to herein as a depression with reference to FIGS. 1-2) on a portion of the horizontal surface 132 of the platter 130 nearest the operator. This feature allows read modules located on the operator's side of the device to achieve reading of codes near the horizontal surface without having to protrude into the workspace. This configuration may eliminate or reduce the problem of interfering with the operator by removing any vertically-protruding features from the operator's side of the scanning device, while still maintaining good read coverage of codes near the horizontal surface.

Figure 4:
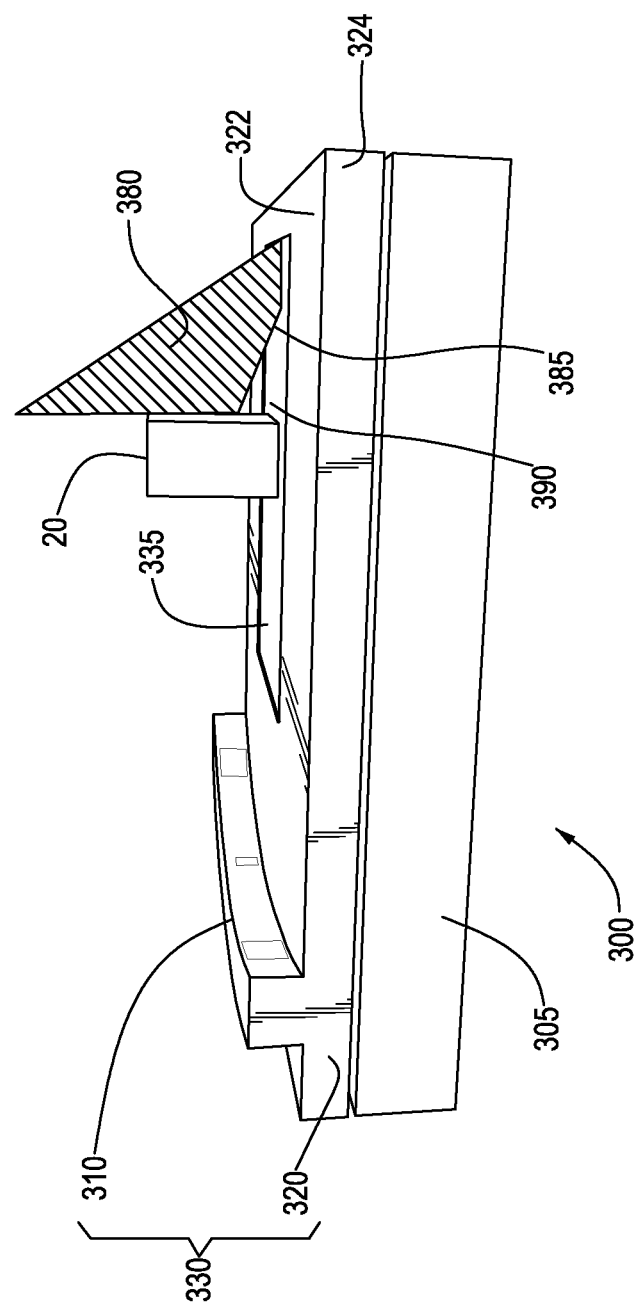
FIG. 4 is a perspective view of a data reader according to a second embodiment.

FIG. 4 illustrates an alternate data reader 300 similar to the previous embodiment of data reader 100 of FIGS. 1-3. The reader 300 includes a lower housing section 305 and an upper section 330. As in the previous embodiment, the upper section 330 may comprise a housing section, a cover section, or in the case of a scanner-scale, a weigh platter. The upper section 330 includes a generally horizontal central section 320 with an upward extension 310 on a first end, but unlike the previous embodiment, the reader 300 includes an elongated horizontal window 335 disposed in the horizontal platter 330, the window 335 extending to a position near a lateral edge of the end section 324. The elongated window 335 provides for an improved angle of view 380 of the read module located at the end 324 of the scanner 300 proximate to the operator, the view 380 passing through an elongated horizontal window 335 on horizontal surface 322 of the weigh platter 330. The elongated shape of the window 335 allows the lower edge 385 of the read module's view 380 to view very close to the bottom side 28 of item 20, minimizing the uncovered scan area 390.

Because typical horizontal scan window materials are expensive, this arrangement may be more costly than the embodiment of data reader 100. Alternately, instead of the elongated window 335, a separate second window may be installed in the surface 322 of the platter 330. The first window being approximately the same as window 135 from FIG. 1 and the second window being of sufficient size to allow the view 380 to pass therethrough.

Figure 5:
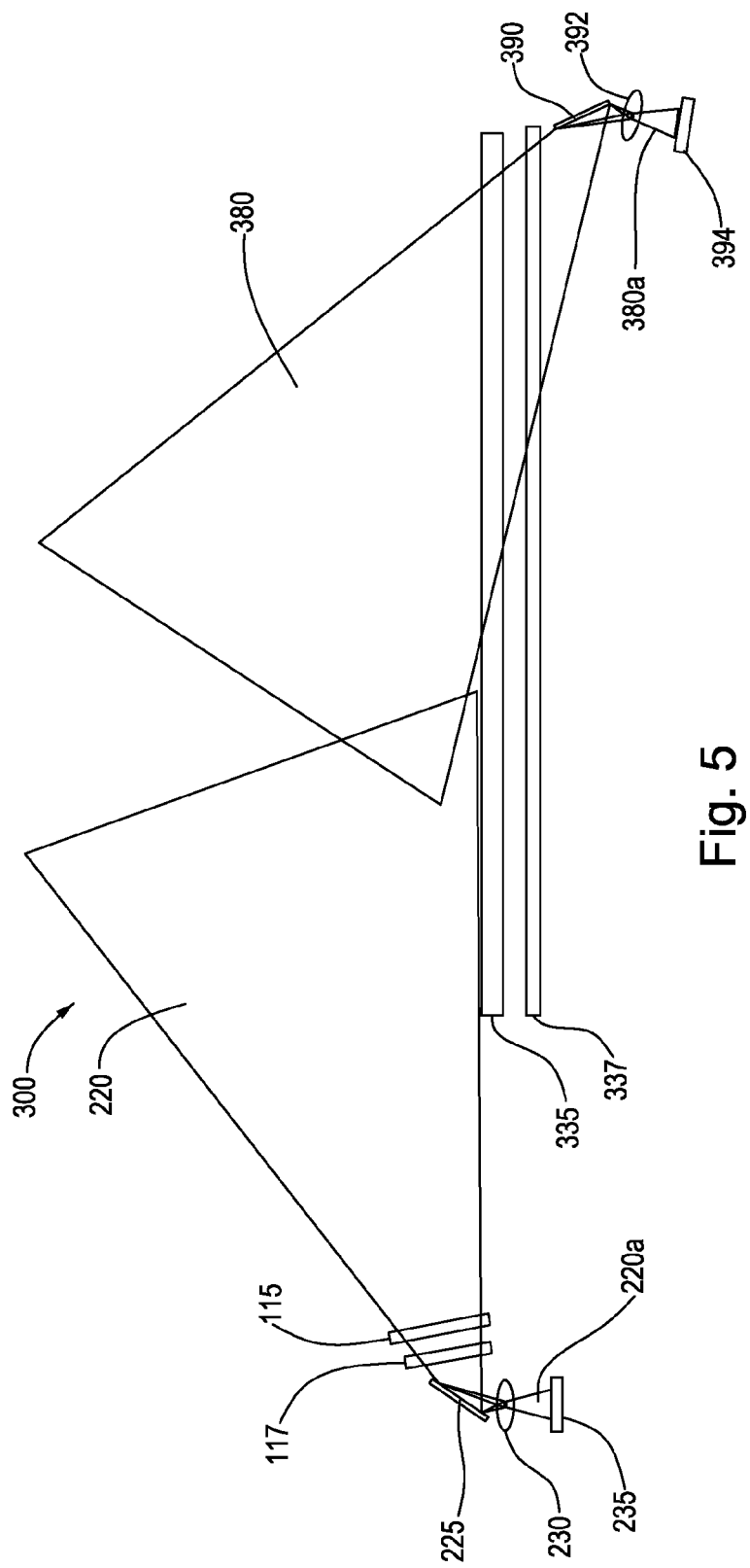
FIG. 5 is a schematic of scan regions and imaging components for the data reader of FIG. 4.

FIG. 5 illustrates example imaging system components for the data reader 300 of FIG. 4 that may be used for reading optical codes on items which are facing either towards the data reader operator, or away from the operator. Most of the enclosure components have been removed to reveal the interior optical arrangement. For reference, the upper horizontal window 335 from FIG. 4 is included in FIG. 5. The checker side 34 of items facing the operator are primarily viewed by the folded imaging system comprising imager or sensor array 394, lens system 392, and folding mirror 390. The field of view of this camera in the plane of FIG. 5 is represented by the shaded regions 380 and 380a. Region or view segment 380a is the field of view of the camera formed by image sensor 394 and lens system 392 prior to reflection from fold mirror 390. Region or view segment 380 is the camera (image sensor 394 and lens system 392) field of view after being redirected or folded by primary fold mirror 390. The arrangement of the aforementioned components is such that none of these items protrudes substantially above the plane defined by the top surface of the upper horizontal window 335. The components of the data reader 300 are kept from rising above the work surface plane by utilizing an elongated set of windows 335 and 337 which allow the field of view 380 to exit at a position and angle usable for reading optical codes on the checker side 34 of objects facing the operator.

In a similar fashion, the customer side of items facing away from the operator are primarily viewed by the folded imaging camera comprising sensor 235, lens system 230, folding mirror 225, and through window 115 as in the previous embodiment of data reader 100 of FIGS. 1-3 (like numbers referring to like components). The field of view of this camera in the plane of the figure is represented by the shaded regions 220 and 220a. Region or view segment 220a is the field of view of the camera formed by image sensor 235 and lens system 230 before reflection from fold mirror 225. Region or view segment 220 is the camera (image sensor 235 and lens system 230) field of view after being redirected or folded by primary fold mirror 225. This imaging system's components may protrude above the top surface of horizontal window 335 because they are distal from the operator and will not interfere with typical body motions of the operator. As with previous embodiments, it is possible in other alternative embodiments that both cameras may protrude above the work surface, or that neither may protrude above the work surface.

Both the first embodiment of data reader 100 and the second embodiment of data reader 300 are configured with a low profile vertical section 110 or 310. Other configurations, including configurations with higher profiles, for these vertical sections may be employed such as those vertical section configurations disclosed in U.S. patent application Ser. Nos. 12/645,984 and 12/646,829 hereby incorporated by reference. Further, for scanner-scale applications, the weigh platter may be configured in a dual plane configuration such as the such as the All-Weighs® platter available from Datalogic Scanning, Inc. of Eugene, Oreg. or as described in U.S. Pat. No. RE 40,071, which is hereby incorporated by reference. Following are a few example constructions:

The outside window 115 may be supported on a dual-plane weigh platter with the secondary window 117, the primary fold mirror 225 (behind the secondary window 117), and remaining optics supported off-platter within the housing section.

The entire upper housing section 110 (or 310), the outside window 115, and the primary fold mirror 225 are all supported on-platter and remaining optics supported off-platter within the housing section. The term on-platter refers to any element being supported on or with the platter and thus being part of the load being weighed. The term off-platter refers to elements no supported on or with the platter and thus are not part of the load.

Similarly on the other side of the data reader:

The outside window 160 may be supported on the weigh platter with the secondary window 162, the primary fold mirror 200 (behind the secondary window 162), and remaining optics supported off-platter within the housing section.

The outside window and the primary fold mirror 200 supported on the weigh platter with the remaining optics supported off-platter (behind a secondary window) within the housing section.

Figure 6:
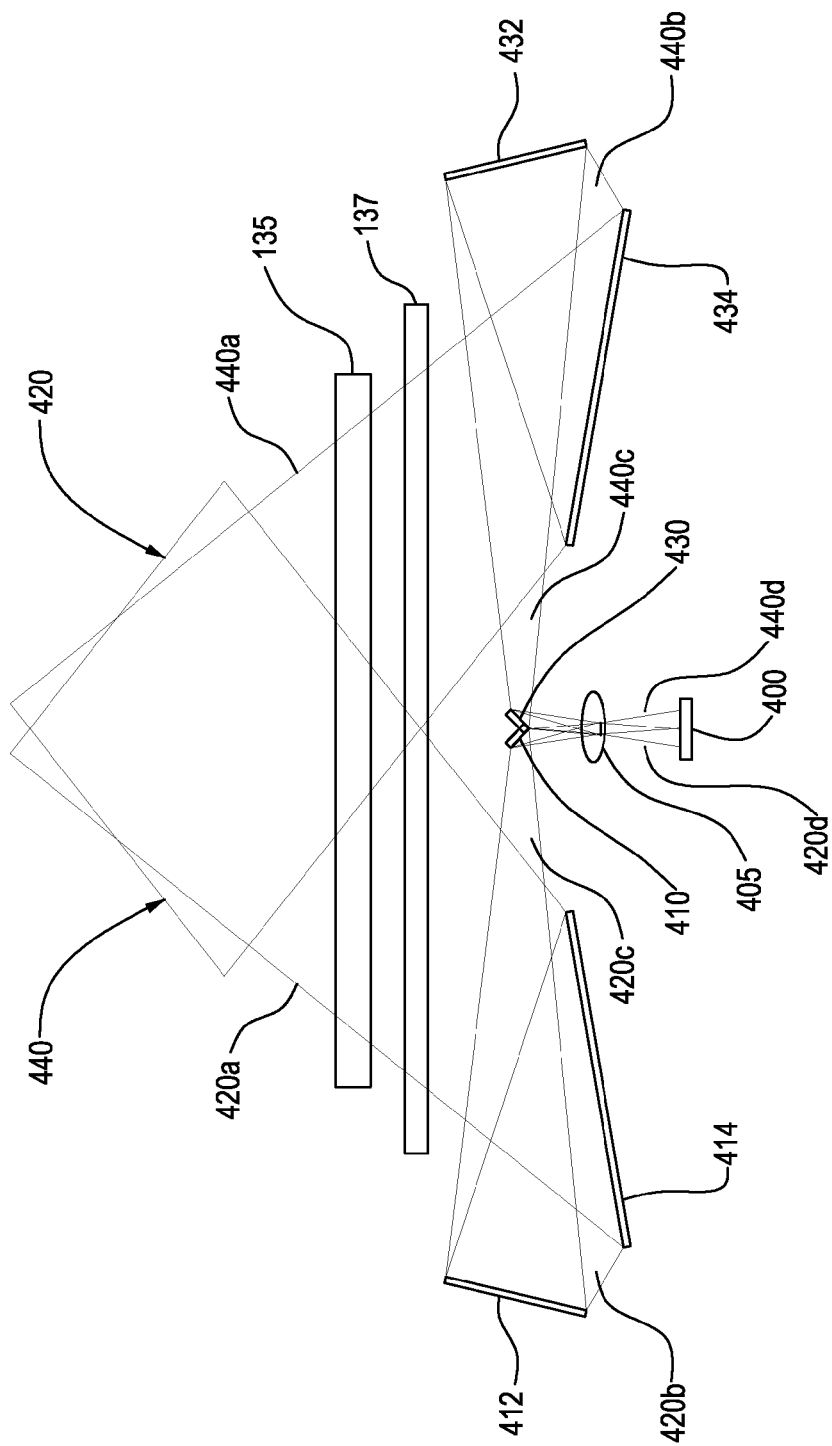
FIG. 6 is a schematic of scan regions and imaging components for scanning lateral sides through the horizontal window of the data readers of FIGS. 1-2 and 4-5.

FIG. 6 schematically illustrates details of an imaging camera system suitable for use in the data reader 100 of FIGS. 1-2 (also applicable to the data reader 300 of FIGS. 4-5 described above and the data reader 500 of FIGS. 7-13 below), the system operative to view optical codes on items which are facing either in the direction of item motion (leading side 30), or away from the direction of motion (trailing side 32). For this functionality, a single imager is used whose field-of-view is split into two parts represented by shaded regions 420 and 440. This camera comprises imager or sensor array 400, lens system 405, field-splitting mirrors 410 and 430, and folding mirror set 414, 412 and folding mirror set 434, 432.

The field of view 420 provides a view of a bottom side 28 and a leading side 30 of an item 20 being passed through the view volume. The field of view 420 has a first view segment 420a passing through the windows 135, 137 and then is redirected upwardly by primary fold mirror 414, whereby second view segment 420b passes to and is redirected sidewardly by secondary mirror 412, whereby third view segment 420c passes to and is redirected downwardly by tertiary mirror 410, whereby fourth view segment 420d is focused by lens system 405 onto imager 400. In similar fashion the field of view 440 provides a view of a bottom side 28 and a trailing side 32 of an item 20. The field of view 440 has a first view segment 440a passing through the windows 135, 137 and then is redirected upwardly by primary fold mirror 434, whereby second view segment 440b passes to and is redirected sidewardly by secondary fold mirror 432, whereby third view segment 440c passes to and is redirected downwardly by tertiary mirror 430, whereby fourth view segment 440d is focused by lens system 405 onto imager 400. The imager 400 may comprise two separate imagers (mounted, for example, on a common printed circuit board), one for each field of view 420, 440 or the imager may comprise a single component having multiple image field regions. One such multiple field region imager is the model EV76C560 1.3 MP CMOS image sensor available from e2V of Essex, England and Saint-Egreve, France. Further embodiments and details for such lateral scan views may be found in U.S. patent application Ser. Nos. 12/645,984 and 12/646,829 hereby incorporated by reference.

It is noted that the figures only show portions of the view volumes, and are not intended to represent either the near field or far field extent of the view volumes.

In some embodiments, the lower viewing windows 135 and 335 and the upper viewing window 115 may be transparent plates that may be separated or adjoining. In other configurations, the lower windows 135, 335 may be divided into multiple windows. In one alternate embodiment as shown in FIG. 1, the upper housing section 110 may include additional windows 115a, 115b along with suitable fold mirrors and cameras (focusing lenses and image sensors) for providing additional scan views. The angle of the view through window 115a may provide a view of both the leading side 30 and the customer side 36. The angle of the view through window 115b may provide a view of both the trailing side 32 and the customer side 36. The views through windows 115, 115a and 115b may be routed to a common imager having multiple regions.

Depending on the layout of the reader, the environment or the store/checkout stand arrangement, ambient lighting may be sufficient to provide adequate illumination. In some embodiments, additional light sources may be added. For example, in the data reader of FIGS. 1-3, light sources may comprise any suitable light source such as a row or array of LEDs (Light Emitting Diodes) mounted in/on the upper housing section 110 and a row/array of LEDs mounted in/on the lower housing section pointed into the view volume and positioned to illuminate an object 20 with respect to one or more perspectives. The LEDs may be disposed on the housing structure or may be mounted internally behind windows 115, 135. Any suitable number of LED arrays may be employed. In some embodiments, different wavelengths of light are directed to illuminate different regions of an object for different perspectives. In some embodiments, the one or more of the light sources may be operated in a pulsed mode, the pulsing synchronized with the imager frame rate or a multiple thereof. In one example, the imagers may be selected with a frame rate of 30 Hz and one or more of the light sources used to illuminate the read region are pulsed at 60 Hz. Examples of light source pulsing is described in U.S. Pat. No. 7,234,641, hereby incorporated by reference.

FIGS. 7-13 illustrate a data reader 500 according to another embodiment. It is noted that the internal optics are the same as shown in the schematics of FIGS. 3 and 6 and thus like element numerals will be employed. Moreover, details of the reader 500 may be applied to the readers 100 and 300 of the previous embodiments. The reader 500 is illustrated with an integrated scale but may be modified to omit the scale feature. For ease of description, the following discussion will refer to the cover or platter element as a weigh platter.

The data reader 500 includes a lower section 505 and an upper platter section 530. The platter section 530 includes a generally horizontal central section 520 with an upward extension 510 on a first end and a depression 540 on a second end opposite the upward extension. The operator stands or sits adjacent to the scanning device end 524 (the far or distal end from the vertical section 510), and away from end 522 (the near or proximate end to the vertical section 510), and moves items across the scanner horizontal surface 532. Read modules view items being moved past the view volumes of the scan windows 115, 135, and 160. Because the end 522 of the data reader 500 is on the side away from the operator, it is possible to provide a (preferably) small, vertically-protruding section 510 to contain a read module behind window 515. Additional read modules may be provided at different positions along the vertical section 510 or at other positions behind window 515.

Figure 7:
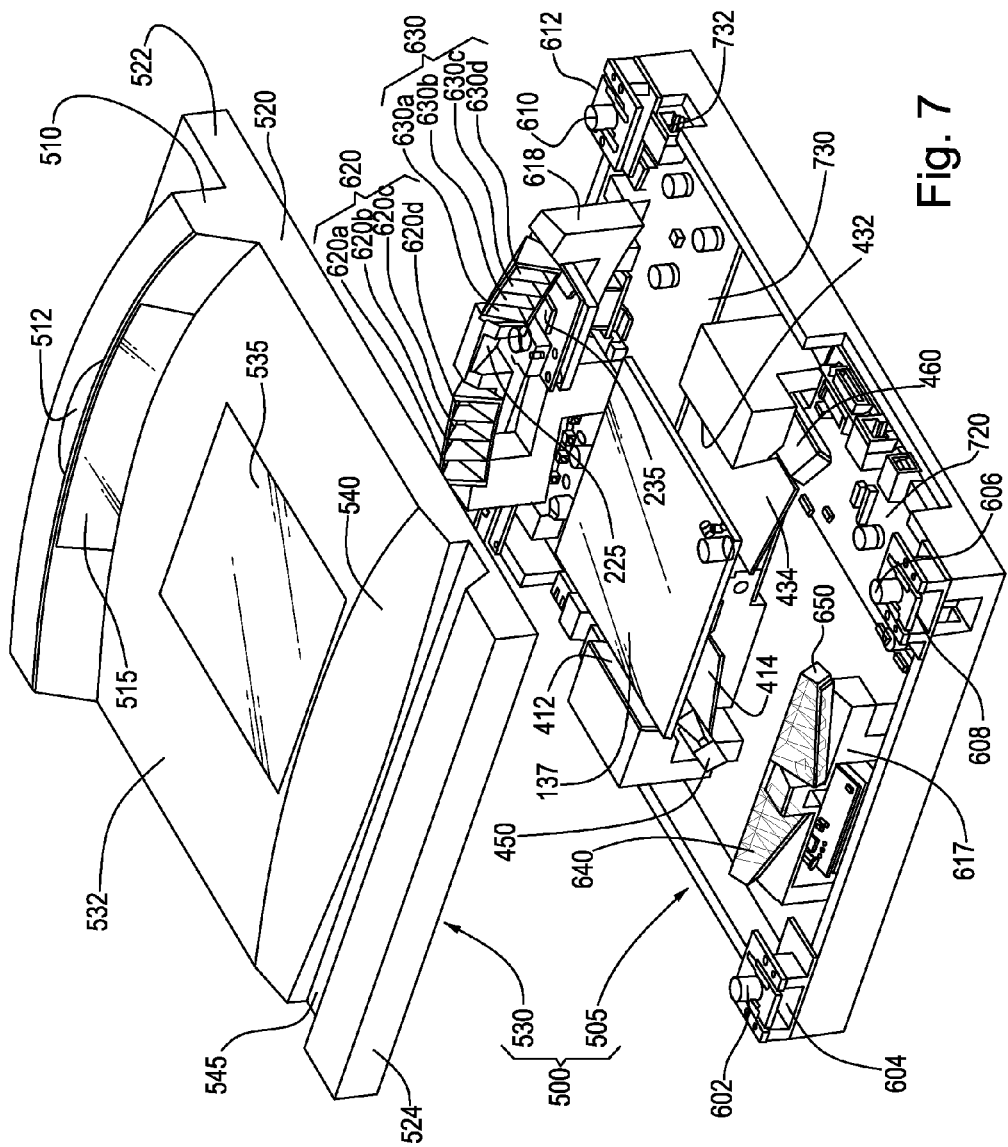
FIG. 7 is a partly exploded, top front right isometric view of a data reader according to a third embodiment.
Figure 8:
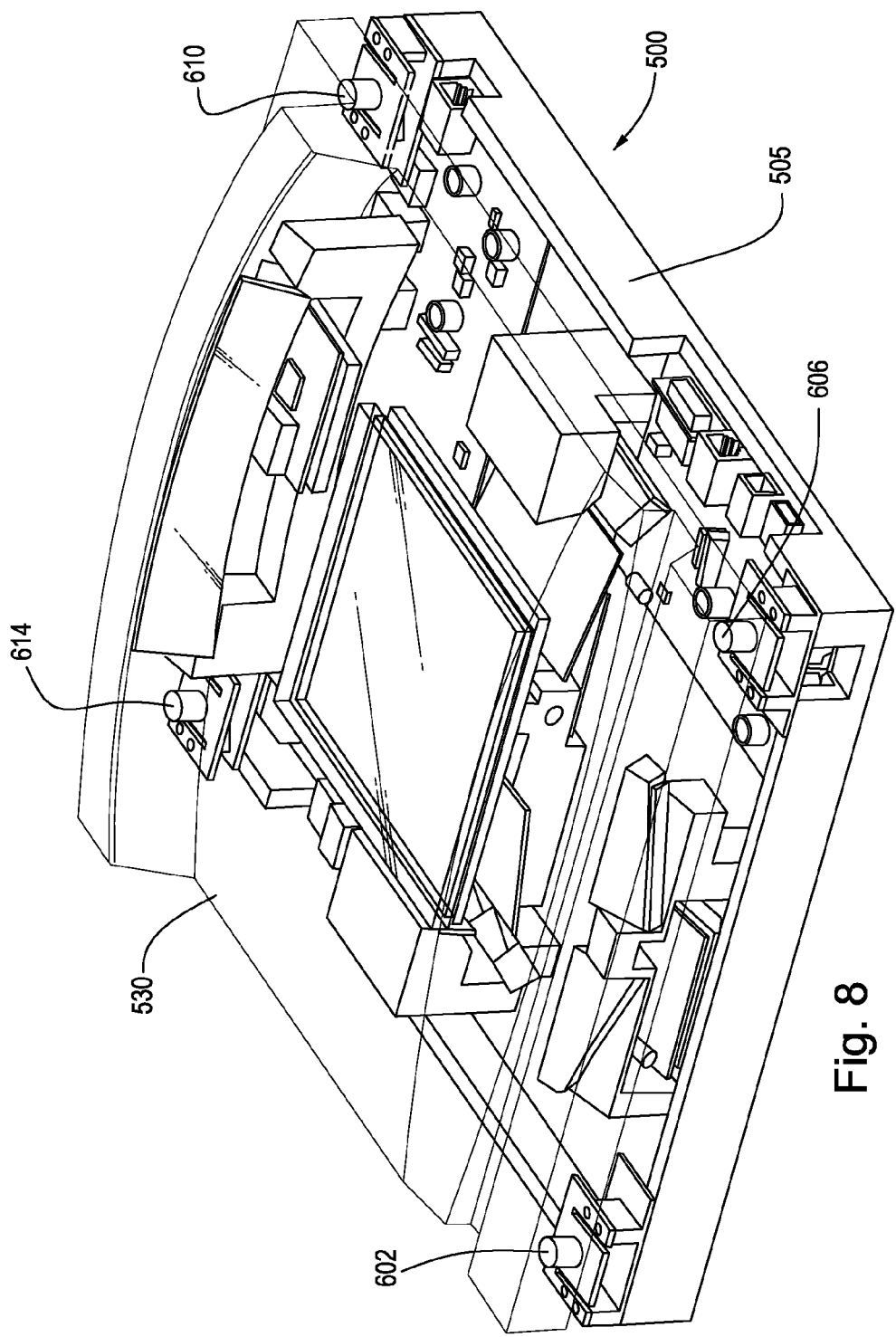
FIG. 8 is a top front right isometric view of the data reader of FIG. 7 with the top platter/cover section in phantom lines.
Figure 9:
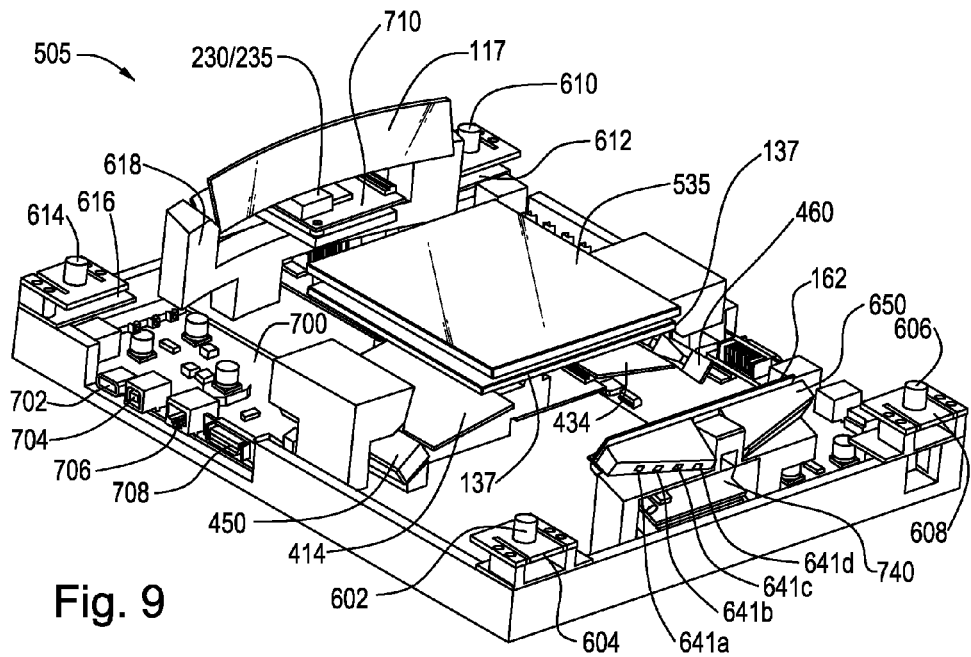
FIG. 9 is a top front left isometric view of the data reader of FIG. 7 with the top cover removed.
Figure 10:
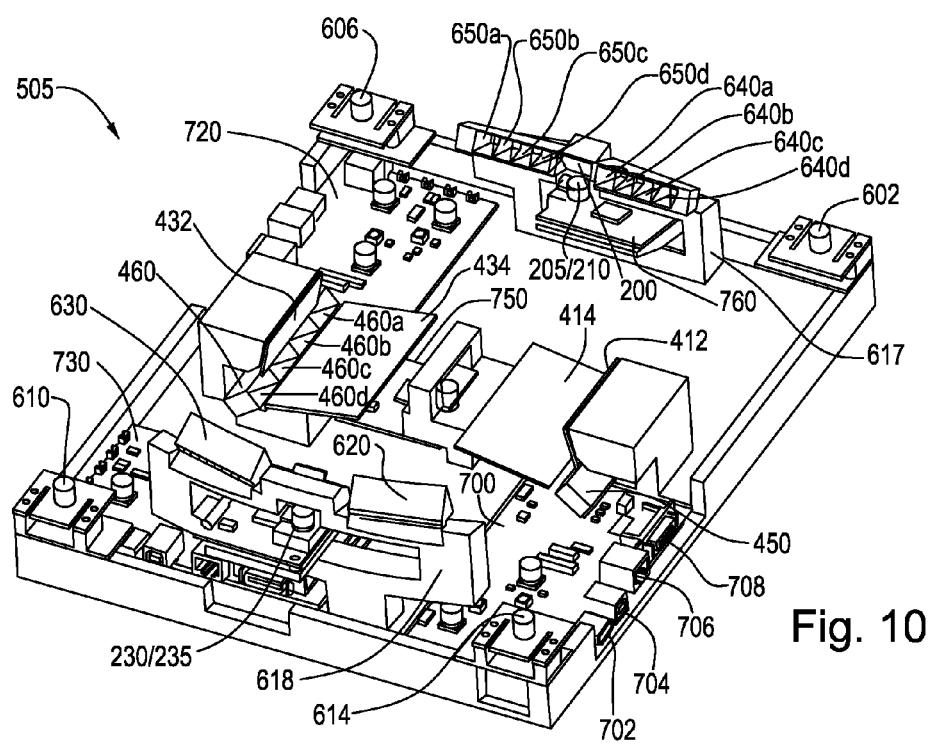
FIG. 10 is a top rear left isometric view of the data reader of FIG. 7 with the top cover removed.
Figure 11:
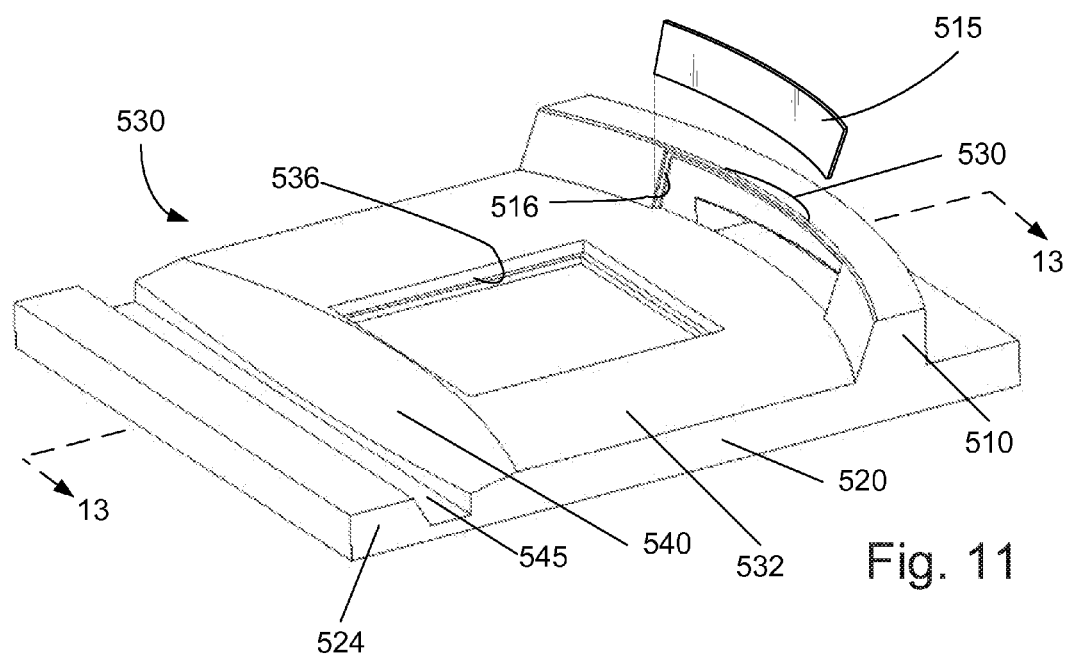
FIG. 11 is a partly exploded, top front right isometric view of the cover section of the data reader of FIG. 7 with the central window removed.
Figure 12:
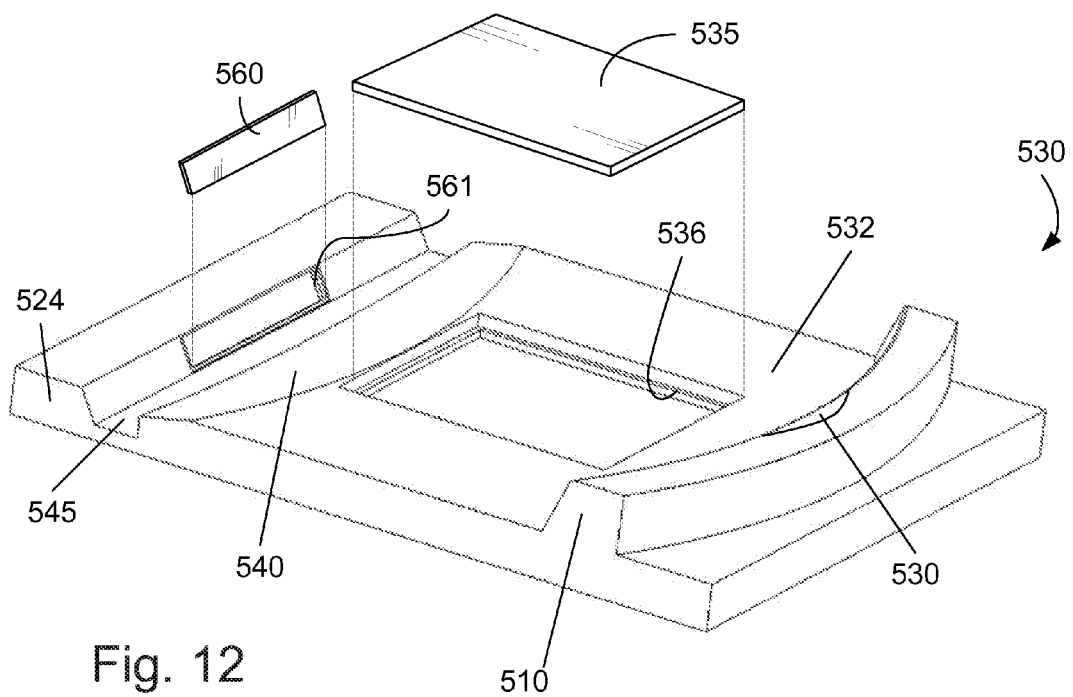
FIG. 12 is a partly exploded, top rear right isometric view of the cover section of the data reader of FIG. 7.
Figure 13:
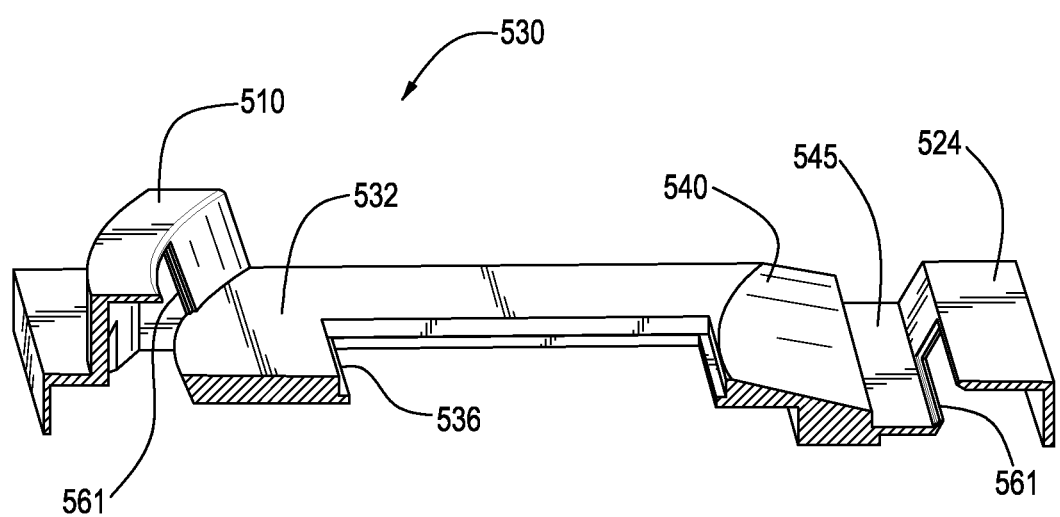
FIG. 13 is an isometric of a cross-sectional view of the cover of FIG. 11 taken along line 13-13, with the central window being removed.

The reader 500 includes a lower section 505 which contains or otherwise supports all the electronics and optics components. FIG. 7 is an exploded isometric view of the reader 500 with the weigh platter 530 removed and suspended above the lower section 505. FIG. 8 illustrates the platter 530 in phantom lines installed in position on the lower section 505. FIGS. 9 and 10 are further isometric views of the lower section 505 with the platter removed. The lower section 505 is shown with portions of its internal cover removed in order to reveal internal components. The internal cover encloses the internal electronic and optical components and supports/contains the internal windows, namely lower horizontal window 137, window 417, and window 162.

The platter section 530 (referring to FIGS. 7 and 11-13) is preferably formed with a one-piece under-structure of molded plastic. The lower section 505 includes four support post and load cell combinations (referring to FIG. 9: in the lower left hand corner post 602 and load cell 604; in the lower right hand corner post 606 and load cell 608; in the upper right hand corner post 610 and load cell 612; in the upper left hand corner post 614 and load cell 616). The entire platter structure 530 rests on and engages the load cell posts 602, 606, 610, 614 nesting thereon as shown in FIG. 8. The platter section 530 includes a central horizontal section 532 containing horizontal window 535. The horizontal window 535 nests within a ridge/shoulder 536 in the platter central portion such that the window is flush with the horizontal surface 532. As in a prior embodiment, to adequately scan codes on the surfaces of items facing the operator, a gentle depression 540 is disposed in the otherwise horizontal surface 532 of the platter 530, extending from a position proximate the window 535 along a downward slope toward the checker end 124. The depression 540 allows the scanning module(s) housed behind window 560 to view down to very near the bottom of the items being scanned. A drain channel 545 and/or drain hole(s) (as in previous embodiment) may be provided to divert spills and debris from accumulating in the channel 545 near the scan window 560. In this embodiment, the depression 540 extends the entire width of the platter 530. The width of the channel 545 is such as to accommodate the width of an operator's finger or thumb, wherein an operator may, using a rag or paper towel, clean out debris or liquid accumulating in the channel 545. The channel 545 may sloped and/or include a drain as previously described.

The shape of the depression 540 in combination with the channel 545 serves to provide a funneling or collection function for articles placed on the weigh platter 530. This function may be particularly useful for stabilizing spherical items being weighed, such as oranges or melons, which tend to roll, potentially rolling off scale. A melon, for example, will stabilize within the depression 540, against the back wall of the channel 545 facilitating the weighing operation.

The vertical section 510 may optionally be formed with a central indention 512. The indention 512 serves a similar function of centering or stabilizing items being weighed that extend over and onto the top surface of the vertical section 110. The indention 512 combines with the arcuate shape of the vertical section 510 of the platter 530, as well as with the depression 540 to stabilize items placed on the weigh scale. A particularly long article, such as a stalk of celery, may be stabilized with one end in the depression 540 and one end in the indentation 512.

A vertical window 515 is a curved structure set within and nesting into shoulder/ridge 516 at the front face of the vertical section 510. Since the vertical window 515 is recessed within the curvature of the vertical section 510, the vertical window 515 may not require the more expensive scratch-resistant glass preferred for the horizontal window 535. Similarly, the scan window 560 in the end section 524 nests within a ridge/shoulder 561 of the rear face of the channel 545.

Details of the optics and electronics of the lower section 505 are illustrated in FIGS. 7-10. The checker side 34 of items facing the operator are primarily viewed by the folded imaging system comprising an imager or sensor array 210 and lens system 205 (see FIG. 3), primary fold mirror 200, and windows 560 and 162. The lens and sensor assembly 205/210 is mounted on a printed circuit board, PCB 760. The arrangement of the aforementioned components is preferably such that none of these components protrudes substantially above the plane defined by the top surface of the upper horizontal window 535, yet still allows the field of view to exit/enter at a position and angle necessary for reading optical codes on the checker side 34 of objects facing the operator without the need for overly large and expensive windows.

In a similar fashion, the customer side 36 of an item 20 with codes facing away from the operator is primarily viewed by the folded imaging system comprising imager or sensor array 235 and lens system 230 (see FIG. 3), folding mirror 225, and windows 515, 517. The lens system and sensor array assembly 230/235 is mounted on PCB 710. The view segment of this camera 230/235 is redirected or folded by primary fold mirror 225. This imaging system's components may protrude above the top surface of horizontal window 535 because they are distant from the operator and should not interfere with typical body motions of the operator. It is possible in alternative embodiments that both cameras may protrude above the work surface, or that neither may protrude above the work surface.

As previously described above with reference to FIG. 6, the reader 500 of FIGS. 7-13 is operative to view optical codes on items which are facing either in the direction of item motion (leading side 30), or away from the direction of motion (trailing side 32). For this functionality, a single imager is used whose field-of-view is split into two parts. This camera comprises imager or sensor array 400 and lens system 405 (see FIG. 6), folding mirror set 414, 412 and 410 and folding mirror set 434, 432, and 430. Though shown schematically in FIG. 6, the sensor array 400 and lens system 405 are not visible in FIGS. 7-10 but comprise a camera assembly mounted on PCB 750. It is noted that the field-splitting mirrors 410 and 430 and lens system 405 are described above with reference to FIG. 6.

The field of view from primary mirror 414 provides a view of a bottom side 28 and a leading side 30 of an item 20 being passed through the view volume. The field of view has a first view segment passing through the windows 535, 137 and then is redirected upwardly by primary fold mirror 414, whereby second view segment passes to and is redirected sidewardly by secondary mirror 412, whereby third view segment passes to and is redirected downwardly by tertiary mirror 410, whereby fourth view segment 420d is focused by lens system 405 onto imager 400. Though shown schematically in FIG. 6, the sensor array 400 and lens system 405 are not visible in FIGS. 7-10 but comprise a camera assembly mounted on PCB 750. In similar fashion the field of view from primary mirror 414 provides a view of a bottom side 28 and a trailing side 32 of an item 20. This field of view has a first view segment passing through the windows 535, 137 and then is redirected upwardly by primary fold mirror 434, whereby second view segment passes to and is redirected sidewardly by secondary fold mirror 432, whereby third view segment passes to and is redirected downwardly by tertiary mirror 430, whereby fourth view segment 440d is focused by lens system 405 onto imager 400. It is noted that the field-splitting mirrors 410 and 430, imager 400 and lens system 405 are described above with reference to FIG. 6. The imager 400 may comprise two separate imagers (mounted, for example, on a common printed circuit board), one for each field of view or the imager may comprise a single component having multiple image field regions. One such multiple field region imager is the model EV76C560 1.3 MP CMOS image sensor available from e2V of Essex, England and Saint-Egreve, France. Further embodiments and details for such lateral scan views may be found in U.S. patent application Ser. Nos. 12/645,984 and 12/646,829 incorporated by reference.

The imagers may operate under ambient light conditions (i.e. without illumination), but the reader is preferably equipped with means for illuminating the field of view. The reader 500 has lighting modules for each of the fields of view. Illumination modules 620, 630 are disposed behind window 117, one module on each side of the primary mirror 225 for illuminating the field of view for the imager 235. The illumination modules 620, 630 include a four part reflector array with one or more LEDs positioned to direct illumination into the field of view along a desired pathway. Illumination module 620 has four reflector cones 620a, 620b, 620c, 620d. Illumination module 630 has four reflector cones 630a, 630b, 630c, 630d. The reflector cones 630a-c have reflective inner surfaces operative to reflect and direct light from the one or more LEDs disposed in the base of the cone.

Illumination modules 640, 650 are disposed behind window 162, one module on each side of the primary mirror 200 for illuminating the field of view for the imager 210. The illumination modules 640, 650 include a four part reflector array with one or more LEDs positioned to direct illumination into the field of view along a desired pathway. Illumination module 640 has four reflector cones 640a, 640b, 640c, 640d. Illumination module 650 has four reflector cones 640a, 640b, 640c, 640d. The reflector cones have reflective inner surfaces operative to reflect and direct light the one or more LEDs disposed in the base of the cone.

The illumination modules 620, 630 or the illumination modules 640, 650 may be alternately illuminated to mitigate the effects of specular reflection on a reflective object (for example, a metal soft drink can) such as by a method disclosed in U.S. Pat. No. 6,899,272 hereby incorporated by reference.

Illumination module 450, 460 are disposed behind window 137, with module 450 to one side of the primary mirror 414 for illuminating the field of view from primary mirror 414 to the imager 400 and module 460 to one side of the primary mirror 434 for illuminating the field of view from primary mirror 434 to the imager 400. The illumination module 450, 460 include a four part reflector array with one or more LEDs positioned to direct illumination into the field of view along a desired pathway. Illumination module 460 is shown with four reflector cones 460a, 460b, 460c, 460d. Illumination module 450 has a similar reflector cone structure. The reflector cones have reflective inner surfaces operative to reflect and direct light the one or more LEDs disposed in the base of the cone.

Electronics for the unit are included on various printed circuit boards (PCBs) mounted and contained within the lower housing. PCB 700 among other elements, certain connectors, including a USB connector 702, a USB connector 704, RJ network connector 706 and a serial (e.g. camera link) connector 708. PCB 720 is equipped with similar connectors. PCB 730 also is equipped with an RJ network connector 732.

Though described primarily with respect to a checker-assisted data reader, the readers and methods described herein may be employed in a self-checkout system. The optical readers described herein may be employed in an automatic reader, such as a tunnel scanner employing multiple housing portions that obtain multiple perspectives through multiple viewing windows.

In addition to the variations and combinations previously presented, the various embodiments may advantageously employ lenses and light baffles, other arrangements, and/or image capture techniques disclosed in U.S. Pat. Pub. No. 2007/0297021, hereby incorporated by reference.

The imaging systems described herein may employ a fixed virtual scan line pattern for decode images such as used in the Magellan-1000i model scanner made by Datalogic Scanning, Inc. of Eugene, Oreg. In some embodiments, an alternative technique based on a vision library may be used with one or more of the imagers. The data reader system may alternately comprise a hybrid system including both flying spot laser scanner and an imaging reader, for example, the upper housing section 110 may comprise a laser scanner and the reader reading through window 160 may comprise an imaging system with its field of view passing over the depression 140.

Partial portions of an optical code (from multiple perspectives) may be combined to form a complete optical code by a process known as stitching. Though stitching may be described herein by way of example to a UPCA label, one of the most common types of optical code, it should be understood that stitching can be applied to other type of optical labels. The UPCA label has "guard bars" on the left and right side of the label and a center guard pattern in the middle. Each side has 6 digits encoded. It is possible to discern whether either the left half or the right half is being decoded. It is possible to decode the left half and the right half separately and then combine or stitch the decoded results together to create the complete label. It is also possible to stitch one side of the label from two pieces. In order to reduce errors, it is required that these partial scans include some overlap region. For example, denoting the end guard patterns as G and the center guard pattern as C and then encoding the UPCA label 012345678905, the label could be written as G012345C678905G.

Stitching left and right halves would entail reading G012345C and C678905G and putting that together to get the full label. Stitching a left half with a 2-digit overlap might entail reading G0123 and 2345C to make G012345C. One example virtual scan line decoding system may output pieces of labels that may be as short as a guard pattern and 4 digits. Using stitching rules, full labels can assembled from pieces decoded from the same or subsequent images from the same camera or pieces decoded from images of multiple cameras. Further details of stitching and virtual line scan methods are described in U.S. Pat. Nos. 5,493,108 and 5,446,271, which are herein incorporated by reference.

In some embodiments, a data reader includes an image sensor that is progressively exposed to capture an image on a rolling basis, such as a CMOS imager with a rolling shutter. The image sensor is used with a processor to detect and quantify ambient light intensity. Based on the intensity of the ambient light, the processor controls integration times for the rows of photodiodes of the CMOS imager. The processor may also coordinate when a light source is pulsed based on the intensity of the ambient light and the integration times for the photodiode rows.

Depending on the amount of ambient light and the integration times, the light source may be pulsed one or more times per frame to create stop-motion images of a moving target where the stop-motion images are suitable for processing to decode data represented by the moving target. Under bright ambient light conditions, for example, the processor may cause the rows to sequentially integrate with a relatively short integration time and without pulsing the light source, which creates a slanted image of a moving target. Under medium light conditions, for example, the rows may integrate sequentially and with an integration time similar to the integration time for bright ambient light, and the processor pulses the light source several times per frame to create a stop-motion image of a moving target with multiple shifts between portions of the image. The image portions created when the light pulses may overlie a blurrier, slanted image of the moving target. Under low light conditions, for example, the processor may cause the rows to sequentially integrate with a relatively long integration time and may pulse the light source once when all the rows are integrating during the same time period. The single pulse of light creates a stop-motion image of a moving target that may overlie a blurrier, slanted image of the moving target.

In some embodiments, a data imager contains multiple CMOS imagers and has multiple light sources. Different CMOS imagers "see" different light sources, in other words, the light from different light sources is detected by different CMOS imagers. Relatively synchronized images may be captured by the multiple CMOS imagers without synchronizing the CMOS imagers when the CMOS imagers operate at a relatively similar frame rate. For example, one CMOS imager is used as a master so that all of the light sources are pulsed when a number of rows of the master CMOS imager are integrating.

Another embodiment pulses a light source more than once per frame. Preferably, the light source is pulsed while a number of rows are integrating, and the number of integrating rows is less than the total number of rows in the CMOS imager. The result of dividing the total number of rows in the CMOS imager by the number of integrating rows is an integer in some embodiments. Alternatively, in other embodiments, the result of dividing the total number of rows in the CMOS imager by the number of integrating rows is not an integer. When the result of dividing the total number of rows in the CMOS imager by the number of integrating rows is an integer, image frames may be divided into the same sections for each frame. On the other hand, when the result of dividing the total number of rows in the CMOS imager by the number of integrating rows is not an integer, successive image frames are divided into different sections.

Other embodiments may use a mechanical shutter in place of a rolling shutter to capture stop-motion images of a moving target. The mechanical shutter may include a flexible member attached to a shutter that blocks light from impinging a CMOS imager or other suitable image sensor. The shutter may be attached to a bobbin that has an electrically conductive material wound around a spool portion of the bobbin, where the spool portion faces away from the shutter. The spool portion of the bobbin may be proximate one or more permanent magnets. When an electric current runs through the electrically conductive material wound around the spool, a magnetic field is created and interacts with the magnetic field from the one or more permanent magnets to move the shutter to a position that allows light to impinge a CMOS imager or other suitable image sensor.

These and other progressive imaging techniques are described in detail in U.S. patent application Ser. No. 12/642,499 filed Dec. 18, 2009 entitled "SYSTEMS AND METHODS FOR IMAGING," hereby incorporated by reference.

It is intended that subject matter disclosed in portion herein can be combined with the subject matter of one or more of other portions herein as long as such combinations are not mutually exclusive or inoperable.

In addition, many variations, enhancements and modifications of the imager-based optical code reader concepts described herein are possible. For example, the fold mirrors 410, 430 may comprise a split mirror configuration.

The terms and descriptions used above are set forth by way of illustration only and are not meant as limitations. Thus while certain preferred embodiments and applications have been shown and described, it will be apparent to those having skill in the art that many changes may be made to the details of the above-described embodiments without departing from the underlying principles of the invention. The scope of the present invention should, therefore, be determined only by the following claims.

The invention claimed is:

1. A data reading system, comprising:
a housing;
a cover supportable on the housing, the cover including (a) a central section comprising a generally horizontal surface, (b) an upward extension at a first end of the cover extending from a first side of the central section, and (c) a depression at a second end of the cover extending from a second side of the central section opposite the upward extension;
a channel disposed in a second end of the cover, the channel having a generally vertical wall on a side of the channel distal to the upward extension;
a camera disposed in the housing and having a view out through an opening in the vertical wall along and over the depression, and into a read region above the horizontal surface of the central section.

2. A data reading system according to claim 1 further comprising a horizontal window disposed in the central section, the data reading system viewing through the horizontal window for reading objects in the read region above the horizontal section.

3. A data reading system according to claim 1, wherein the channel extends a lateral width of the cover.

4. A data reading system according to claim 3 further comprising a window disposed in the opening in the vertical wall of the channel, the depression being configured to provide a better angle of view through the window of an object in the read region above the central section.

5. A data reading system according to claim 3, wherein the depression terminates in the channel.

6. A data reading system according to claim 1 wherein the cover comprises a weigh platter.

7. A data reading system according to claim 1, wherein the cover comprises a weigh platter, and wherein the depression has a shape constructed and arranged in combination with the channel to provide a funneling or collection function for articles placed on the weigh platter.

8. A data reading system, comprising:
a housing;
a cover supportable on the housing, the cover including (a) a central section comprising a generally horizontal surface, (b) an upward extension at a first end of the cover extending from a first side of the central section, (c) a depression at a second end of the cover extending from a second side of the central section opposite the upward extension, (d) a channel disposed in the second end of the cover, the channel extending a lateral width of the cover, parallel to the upward extension, (e) a vertical wall disposed in a side of the channel opposite to the depression and (f) a rear window disposed in the vertical wall;
a fold mirror mounted within the housing behind the rear window;
a camera mounted within the housing below the fold mirror, wherein the fold mirror directing a field of view of the camera through the rear window, through a space within the depression and into a view volume above the central section.

9. A data reading system according to claim 8 further comprising first and second illumination modules disposed on opposite lateral sides of the fold mirror, the illumination modules directing illumination into the view volume.

10. An optical code data reader comprising a horizontal surface section having an upwardly-facing central window over which items to be read are passed; an open depression formed in an upper surface of the horizontal section sidewardly to a front side of the central window; and a camera having a view segment passing sidewardly through a space within the depression and into a view region above the central window.

11. An optical code data reader according to claim 10, wherein no part of the reader on the front side extends upward above the horizontal surface section of the reader.

12. A method for reading an optical code on an object from multiple directions, comprising the steps of:
positioning a first imager and a second imager within a housing of a data reader;
directing a first field of view of the first imager via a first mirror set from a position of the first imager through a first window disposed in a horizontal surface of the data reader into a view volume above the first window from a first perspective;
directing a second field of view of the second imager via a second mirror set from a position of the second imager through a second window, sidewardly over a depression in the horizontal surface, and into the view volume above the first window from a second perspective;
forming a first image at the first imager of the first field of view into the view volume from the first perspective;
forming a second image at the second imager of the second field of view into the view volume from the second perspective;
processing the optical code based on one or more of the first and second images.

13. A method according to claim 12, further comprising:
attempting to decode the optical code along a set of virtual scan lines across the first image; and
attempting to decode the optical code along a set of virtual scan lines across the second image.

14. A method for reading an optical code on an object in a view volume from multiple directions, comprising the steps of:
positioning a first imager and a second imager within a housing of a data reader;
directing a first field of view of the first imager via a first mirror set from a position of the first imager through a first window into the view volume from a first perspective;
directing a second field of view of the second imager via a second mirror set from a position of the second imager through a second window into the view volume from a second perspective;
forming a first image at the first imager of the first field of view into the view volume from the first perspective;
forming a second image at the second imager of the second field of view into the view volume from the second perspective;
processing the optical code based on one or more of the first and second images,
wherein the data reader includes a cover or weigh platter disposed over the housing, the cover or weigh platter comprising
a lower section including the first window oriented generally horizontally;

a depression formed in the lower section to one side of the first window, wherein the second mirror set directing a field of view of the second imager through the second window, through a space within the depression and into the view volume above the lower section.

15. A method according to claim 14 further comprising positioning a third imager within the housing of the data reader;

directing a third field of view of the third imager via a third mirror set from a position of the third imager through a third window into the view volume from a third perspective;

forming a third image at the third imager of the third field of view into the view volume from the third perspective;

wherein the cover or weigh platter comprises an upwardly extending section to one side of the first window opposite the depression and including the third window oriented generally vertically.

16. A method according to claim 15 wherein the first mirror set comprises a first set primary mirror, a first set secondary mirror and a first set tertiary mirror, wherein the step of directing a first field of view comprises passing the first field of view through the first window and reflecting upwardly off the first set primary mirror to the first set secondary mirror, off the first set secondary mirror to the first set tertiary mirror, and off the first set tertiary mirror to the first imager.

* * * * *

UNITED STATES PATENT AND TRADEMARK OFFICE
CERTIFICATE OF CORRECTION

PATENT NO. : 8,430,318 B2  
APPLICATION NO. : 12/985271  
DATED : April 30, 2013  
INVENTOR(S) : Alexander M. McQueen et al.

Page 1 of 1

It is certified that error appears in the above-identified patent and that said Letters Patent is hereby corrected as shown below:

In the Specification

Column 7, Line 61, after "configuration" delete "such as the".

Column 8, Line 10, change "no" to --not--.

Column 10, Line 38, change "may sloped" to --may be sloped--.

Column 13, Line 5, change "for decode" to --for decoding--.

Column 13, Line 40, change "can assembled" to --can be assembled--.

Signed and Sealed this  
Second Day of December, 2014

Michelle K. Lee  
*Deputy Director of the United States Patent and Trademark Office*